(12) United States Patent
Murphy

(10) Patent No.: US 7,211,722 B1
(45) Date of Patent: May 1, 2007

(54) STRUCTURES INCLUDING SYNCHRONOUSLY DEPLOYABLE FRAME MEMBERS AND METHODS OF DEPLOYING THE SAME

(75) Inventor: David Michael Murphy, Santa Barbara, CA (US)

(73) Assignee: AEC-Able Engineering Co., Inc., Goleta, CA (US)

( * ) Notice: Subject to any disclaimer, the term of this patent is extended or adjusted under 35 U.S.C. 154(b) by 416 days.

(21) Appl. No.: 10/117,314

(22) Filed: Apr. 5, 2002

(51) Int. Cl.
*H01L 31/045* (2006.01)
*E04H 12/18* (2006.01)

(52) U.S. Cl. .............. 136/245; 136/292; 52/79.5; 52/173.3; 52/645; 52/646; 343/915

(58) Field of Classification Search ............ 136/245, 136/244, 291, 292; 52/645, 646, 173.3, 79.5; 343/915
See application file for complete search history.

(56) References Cited

U.S. PATENT DOCUMENTS

| | | | | |
|---|---|---|---|---|
| 1,497,281 A | * | 6/1924 | Morris | 318/256 |
| 3,744,500 A | * | 7/1973 | Briggs | 135/140 |
| 4,077,418 A | * | 3/1978 | Cohen | 135/95 |
| 4,361,180 A | * | 11/1982 | Stiivecke | 160/377 |
| 4,557,097 A | | 12/1985 | Mikulas, Jr. et al. | 52/646 |
| 4,578,920 A | | 4/1986 | Bush et al. | 52/645 |
| 4,579,302 A | * | 4/1986 | Schneider et al. | 244/159 |
| 4,604,844 A | | 8/1986 | Mikulas, Jr. et al. | 52/632 |
| 4,677,803 A | | 7/1987 | Mikulas, Jr. et al. | 52/646 |
| 4,750,509 A | * | 6/1988 | Kim | 135/135 |
| 4,942,686 A | * | 7/1990 | Kemeny | 40/610 |
| 5,016,418 A | * | 5/1991 | Rhodes et al. | 52/646 |
| 5,040,349 A | * | 8/1991 | Onoda et al. | 52/646 |
| 5,487,791 A | | 1/1996 | Everman et al. | |
| 5,509,747 A | | 4/1996 | Kiendl | 403/102 |
| 5,660,644 A | * | 8/1997 | Clemens | 136/245 |
| 5,680,145 A | | 10/1997 | Thomson et al. | 343/915 |
| 5,864,324 A | | 1/1999 | Acker et al. | 343/915 |
| 5,931,420 A | | 8/1999 | Yamato et al. | 244/159 |
| 5,961,738 A | | 10/1999 | Benton et al. | 136/245 |
| 6,010,096 A | | 1/2000 | Baghdasarian | |
| 6,038,736 A | | 3/2000 | Nygren | 16/275 |
| 6,158,187 A | * | 12/2000 | Nakajima | 52/646 |
| 6,202,379 B1 | | 3/2001 | Meguro et al. | 52/653.1 |
| 6,225,965 B1 | | 5/2001 | Gilger et al. | 343/915 |

(Continued)

OTHER PUBLICATIONS

Jones et al, "Spacecraft Solar Array Technology Trends," IEEE Conference, Jan. 1998.*

*Primary Examiner*—Nam Nguyen
*Assistant Examiner*—Anthony Fick
(74) *Attorney, Agent, or Firm*—TraskBritt

(57) ABSTRACT

A lightweight structure for space application is deployable from a compact bundle of interconnected struts into a plurality of tiled substantially rectangular bays. Each bay preferably comprises four or six hinged strut members having substantially rectangular cross sections, such that a solar or other suitable blanket may be compactly nested within the bundled struts. In one aspect of the invention, the blanket is attached to two opposed strut members of a six-member strut bundle, such that the blanket is unfolded during deployment of the strut bundle into a substantially rectangular bay. In another aspect of the invention, the blanket is attached to, and held against, a single strut in a strut bundle. After the strut bundle is deployed into a substantially rectangular bay, the blanket is spread across the bay via a cable mechanism or other deployment mechanism.

29 Claims, 10 Drawing Sheets

U.S. PATENT DOCUMENTS

| | | | |
|---|---|---|---|
| 6,298,662 B1 | 10/2001 | Vezain et al. | 60/527 |
| 6,313,811 B1 | 11/2001 | Harless | 349/915 |
| 6,578,593 B2 * | 6/2003 | Leonarz | 135/20.1 |
| 6,784,359 B2 * | 8/2004 | Clark et al. | 136/245 |

* cited by examiner

STRUCTURES INCLUDING SYNCHRONOUSLY DEPLOYABLE FRAME MEMBERS AND METHODS OF DEPLOYING THE SAME

GOVERNMENT LICENSE RIGHTS

The U.S. Government has a paid-up license in this invention and the right in limited circumstances to require the patent owner to license others on reasonable terms as provided for by the terms of Contract No. F29601-00-C-0144 awarded by the Air Force Research Laboratory.

BACKGROUND OF THE INVENTION

The present invention relates generally to structures that are deployable in space, and specifically to structures and methods that are used to deploy areas of flat films, membranes, or blankets.

Deployable array structures for use on spacecraft, satellites, and the like, have been developed in many forms. Generally, solar array structures consist of a plurality of rigid honeycomb panels, which are flat-folded for storage along one dimension, like an accordion pleat, and are extendable outwardly from a spacecraft in a simultaneous or sequential manner. One example of such a configuration of panels is described in U.S. Pat. No. 5,487,791.

A number of existing technologies used in space require deployment of large flat areas or "blankets," such as photovoltaic (PV) blankets, membrane synthetic aperture radar (SAR) blankets, and electromagnetic (e.g., sunlight) shield blankets. The art of deployable space structures is most highly developed for solar arrays utilizing photovoltaic elements, which are the most common applications for deployable space structures.

Existing approaches to deploying a photovoltaic blanket are described in U.S. Pat. No. 5,961,738. These existing systems typically deploy blankets in one direction using one or more linear deploying booms, which spread out parallel structure beams or plates between which the blankets may be tensioned. These systems generally stow into a volume characterized in one dimension as approximately the width of the deployed array.

Power requirements for modern spacecraft have been rapidly increasing in recent years. As a result, increasingly larger-area solar arrays have been developed to meet these power needs. As the number and size of solar array panels is increased, the mass moment of inertia of the corresponding systems is also increased. This increase in mass moment of inertia is detrimental to array design and to spacecraft performance.

In response to these problems, systems that fold in two directions have been developed to counteract the detrimental growth in inertia brought about by larger-area arrays. An example of such a deployment using rigid panels is described in U.S. Pat. No. 6,010,096. These types of systems generally include panels that fold out linearly from the spacecraft, in an accordion fashion, and also laterally to obtain a lower aspect ratio and thus produce a lower mass moment of inertia.

The mass moment of inertia of the system may also be reduced by minimizing the overall mass of the deployable array structure, which in turn reduces the cost for launch. One problem resulting from existing blanket array structures is that they do not permit efficient tiling of individual blankets to produce a large array that satisfies modern power requirements. Further, existing array structures are designed specifically for deploying solar blankets, and thus are not suitable for use in deploying other types of flexible blanket members, such as synthetic aperture radar blankets, and electromagnetic shielding blankets (e.g., sun shield blankets).

Thus, there is a need for a readily deployable, lightweight, modular frame structure that allows for practical incorporation of flexible blanket assemblies, particularly solar blankets. Additionally, there is a need for an array structure that is compactly stowable, and that provides an optimal deployed aspect ratio for the system.

SUMMARY OF THE INVENTION

The present invention is directed to a system and method for deploying a modular structure, including blankets, in space. The structure preferably includes a system of blankets incorporated into a large-area framing structure that is self-deployable in an outward direction as well as across a lateral direction, thereby achieving a low deployment aspect ratio.

In a preferred aspect of the invention, the structure is deployable from a series of interconnected strut bundles into a plurality of modular, or tiled, symmetrical bays. Preferably, each bay is shaped like a parallelogram, and more preferably each bay is substantially rectangular in shape. Further, each bay preferably comprises four or six hinged strut members dimensioned such that a solar blanket or other flexible blanket may be compactly nested within the bundled struts. It will be appreciated from the description that follows, however, that any even number of struts may be used to form the modular bays of the deployable structures of the present invention.

In one aspect of the invention, the blanket is attached between two opposed strut members that form the short edges, or arm struts, of a six-member (or greater-member) bay frame. These two arm struts maintain a parallel positioning as the frame unfolds, which allows the blanket to be unfolded simultaneously with the framing structure into a substantially rectangular bay.

Each bay is preferably comprised of strut members having substantially rectangular cross sections, such that a single rectangular blanket may be folded and compactly nested within the bundled struts. The cross sections of the arm struts and leg struts may be varied to provide the desired rectangular cross section for housing a blanket when in the stowed form, while balancing the interests of deployed structural stiffness and strength.

In another aspect of the invention, the blanket is attached to a single strut in a four-member or six-member (or greater-member) strut bundle. After the strut bundle is deployed into a substantially rectangular bay, the blanket is spread across the bay via a cable mechanism or other suitable deployment mechanism.

In a preferred aspect of the invention, leg struts are connected together via a simple hinge pin or similar arrangement. The corner joints, where leg struts and arm struts connect to one another, preferably comprise a plurality of hinge mechanisms, such as pin joints, held on a shared hinge table. At these connections, it is desired to synchronize the joint angles (relative to the hinge table) to be equal such that the overall structure may be synchronously deployed.

As the hinge table can accommodate four interfacing strut members, the substantially rectangular bays can be "tiled" into an arrangement of frames that share struts. The resulting structure is capable of being folded synchronously into a compact bundle of struts.

In one aspect of the invention, a method of synchronously deploying a modular frame structure, comprising a plurality of interconnected strut members from a bundled configuration into a parallelogram-shaped frame configuration, is described. Additionally, a method of synchronously deploying a modular frame structure, comprising a plurality of interconnected strut bundles into a plurality of parallelogram-shaped modular bays, is described.

In another aspect of the invention, a method of synchronously retracting a deployable frame structure, comprising one or more substantially rectangular array bays, wherein each bay comprises two pairs of leg struts and one pair of arm struts connected to one another via a plurality of hinge mechanisms, is described.

DETAILED DESCRIPTION OF THE PREFERRED EMBODIMENTS

The preferred embodiments will now be described with reference to the drawings. To facilitate description, element numerals designating an element in one figure will represent the same element in any other figure.

Figure 1A:
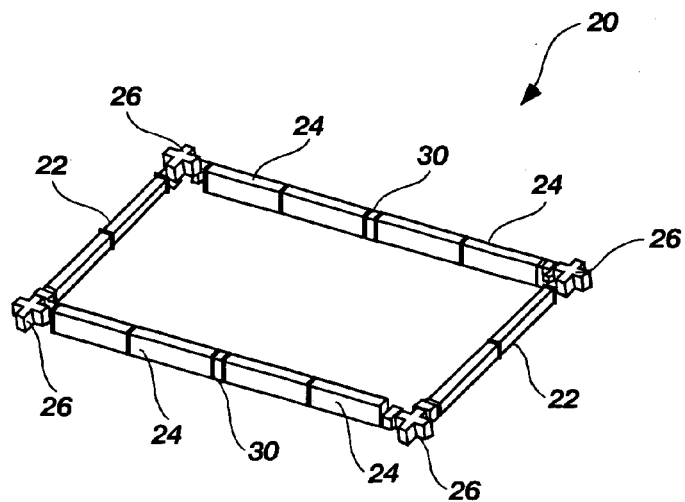
FIG. 1A is a perspective view of a rectangular bay structure according to a preferred embodiment.

FIG. 1A is a perspective view of a rectangular, or substantially rectangular, bay structure 20 according to a preferred embodiment of the present invention. The rectangular bay structure 20 is configured to be tiled to one or more other rectangular bay structures, as further described below. Additionally, the rectangular bay structure 20 may be retracted into, and deployed from, a bundle of struts, as further described below.

The rectangular bay structure 20 preferably comprises two arm struts 22 (alternatively referred to as "yards"), or other suitable frame members, located at opposed ends of the rectangular bay structure 20. Each arm strut 22 is preferably connected to a pair of leg struts 24 (alternatively referred to as "spars"), or other suitable frame members, via two hinge mechanisms 26. The hinge mechanisms 26 are described in greater detail below.

Figure 1B:
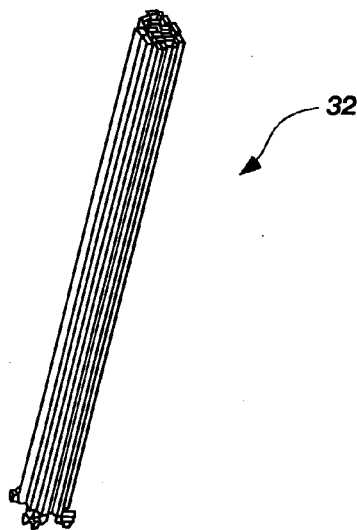
FIG. 1B is a perspective view of a strut bundle used to form the rectangular bay of FIG. 1A.

The arm struts 22 and leg struts 24 preferably all have substantially the same length, such that they may be compactly bundled into a unit having a substantially uniform height, as illustrated in FIG. 1B. The arm struts 22 and leg struts 24 may be of any suitable length, preferably ranging from 1 to 5 meters, and more preferably from 2 to 3 meters.

In a preferred embodiment, the rectangular bay structure 20 includes a pair of leg struts 24 located on each of two opposed sides of the rectangular bay structure 20. The two leg struts 24 that make up each leg strut pair are preferably joined linearly to one another by a hinge mechanism 30, such as a latching knee joint, pin joint, standard hinge, pivot, or other suitable connecting mechanism that allows synchronous pivoting movement between the two leg struts 24. The hinge mechanisms 30 are described in greater detail below.

FIG. 1B is a perspective view of a strut bundle 32 that is deployable into the rectangular bay structure 20 of FIG. 1A. The strut bundle 32 is preferably deployable into a planar two dimensional rectangular frame, as illustrated in FIG. 1A. The arm struts 22 and leg struts 24 are preferably compactly held together around a blanket 34 during stowage to minimize the amount of space required for storing an array structure during launch.

Figure 2:
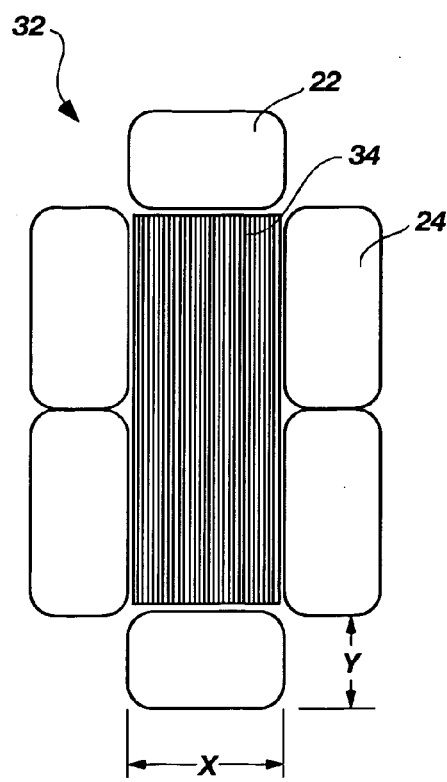
FIG. 2 is a plan view of a blanket folded between six strut members having substantially rectangular cross sections.

FIG. 2 is a plan view of a strut bundle 32 with a blanket 34 folded between the arm struts 22 and leg struts 24. The blanket 34 may be a solar blanket, such as a blanket with photovoltaic elements mounted thereon, or may be any other suitable blanket, such as a synthetic aperture radar blanket or an electromagnetic shielding blanket (e.g., a sun shield blanket).

In a preferred embodiment, the blanket 34 comprises a plurality of photovoltaic energy conversion devices, fabricated via any suitable method and mounted and/or interconnected to form a thin foldable assembly. In one embodiment, the photovoltaic energy conversion devices may be formed directly on the blanket 34 using standard physical or chemical vapor deposition techniques in combination with lithography. The blanket material may comprise a thin plastic film, such as a polyimide film, a metal foil, such as 1 mil titanium, or any other suitable material.

As illustrated in FIG. 2, the arm struts 22 and leg struts 24 preferably have substantially rectangular cross-sections, which provide an advantageous configuration for compactly folding the blanket 34 between the struts 22, 24. The blanket 34, in turn, is preferably rectangular and foldable at equal increments, thereby allowing regular and repeating blanket design and fabrication, as well as providing a straightforward lay down pattern for photovoltaic devices on the blanket 34.

The blanket 34 is preferably attached to one or both arm struts 22, depending on the method of deployment used, as further described below. The arm struts 22 preferably each have a cross-sectional length X of 4 to 10 cm, and a cross-sectional width Y of 2 to 5 cm, although any other suitable cross-sectional size may be employed. The leg struts 24 may be of similar dimension, and preferably have a longer cross-sectional length than the arm struts 22 to promote optimal blanket incorporation, as illustrated in FIG. 2.

Figure 4:
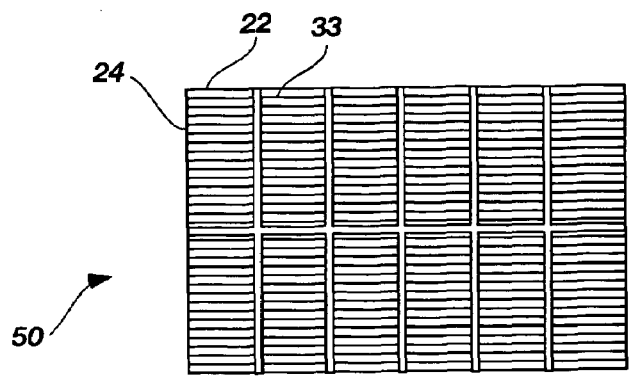
FIG. 4 is a top view of a deployed array structure comprising a plurality of modular rectangular bays according to a preferred embodiment.

The blanket 34 is preferably dimensioned to spread out between the struts 22, 24, and to cover all, or substantially all, of the area defined within the rectangular bay in its deployed configuration. In the stowed configuration, the blanket 34 is preferably flat-folded linearly at substantially uniform fold lines 33 (as illustrated in FIG. 4) ranging from 8 to 20 cm apart, preferably 10 to 14 cm apart, such that it is compactly; folded within the strut bundle 32 as shown in FIG. 2.

Figure 3:
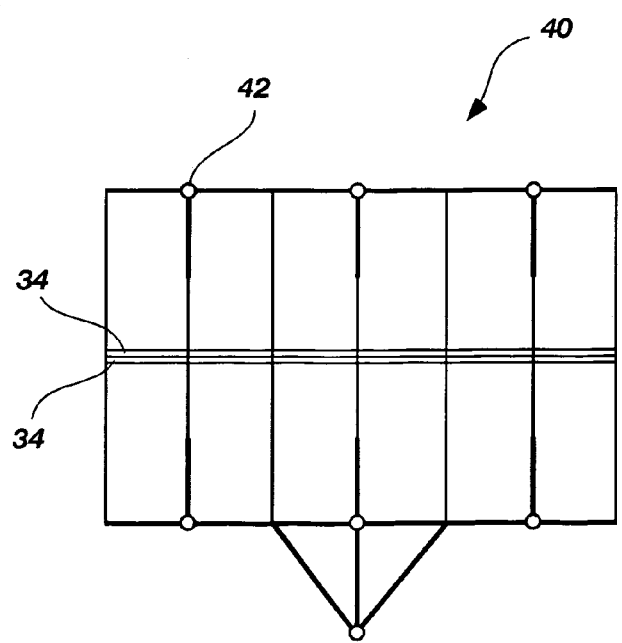
FIG. 3 is a top view of a deployed array structure having motors thereon for deploying blankets.

FIG. 3 is a top view of a deployed array structure 40 having motors 42 located thereon for deploying blankets 34 and the array structure 40 itself. The motors 42 may be stepper motors, or any other lightweight motors suitable for attachment to the array structure 40 and for deploying blankets 34. Each motor 42 preferably includes one or more retractable cables that are connected at a free end to one or more blankets 34. The blankets 34 may be attached to the cables via hooks, fasteners, or other suitable attachment devices. In a preferred embodiment, motors 42 are employed at alternating hinge locations only, which allows the system to be lighter and less costly. Each motor 42 may then be used to reel in cables for two adjacent bays, as described below.

Spreader bars, or other suitable devices, may preferably be used to spread support from the cables across the width of the blanket 34. In a preferred embodiment, each motor 42 preferably includes four cables for deploying two blankets 34. By using spreader bars, each blanket 34 preferably has two cables attached thereto via a spreader bar.

The motors 42 are preferably first activated to deploy the array structure 40, and are then reversed to pull the cables toward the motors 42, thereby pulling the blankets 34 across their corresponding rectangular bays, as further described below. The motors 42 used to deploy the blankets 34 may also be used to retract the blankets 34 into the folded, or stowed, position before the array structure 40 is retracted for stowage. To accomplish this objective, each motor 42 preferably engages a reel mechanism, or other suitable device, which retracts the blankets 34 into the stowed position.

FIG. 4 is a perspective view of a twelve-bay modular array structure 50 including blankets 34 in a fully deployed position. The blankets 34 may be deployed via motors 42, as described above, or may be attached to opposed arm struts 22 and deployed automatically when the strut bundle 32 is deployed, as further described below. The array structure 50 may preferably be attached to a spacecraft via a yoke assembly, a cable, or any other suitable attachment device, as is well known in the art.

Figure 5:
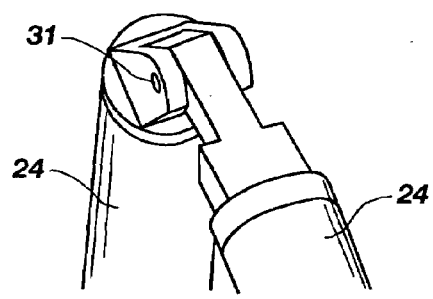
FIG. 5 is a perspective view of a pin joint used to connect two leg struts of a rectangular bay.
Figure 6:
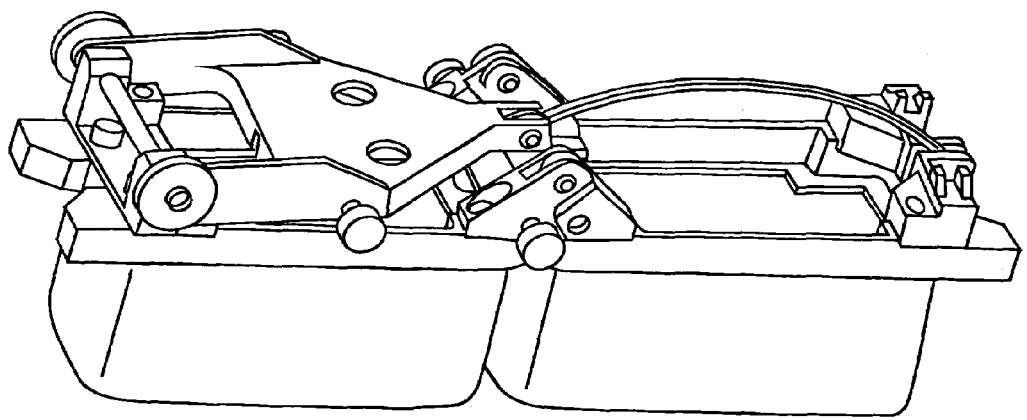
FIG. 6 is a perspective view of a preferred knee joint in an open position.

FIGS. 5–9 illustrate a plurality of hinge devices that may be employed in the deployable structure of the present invention. FIG. 5 illustrates a pin joint 31 that may be used to linearly connect two leg struts 24 to one another. FIG. 6 illustrates an alternative latching knee joint 35 that may be used to linearly connect two leg struts 24 to one another.

Figure 7:
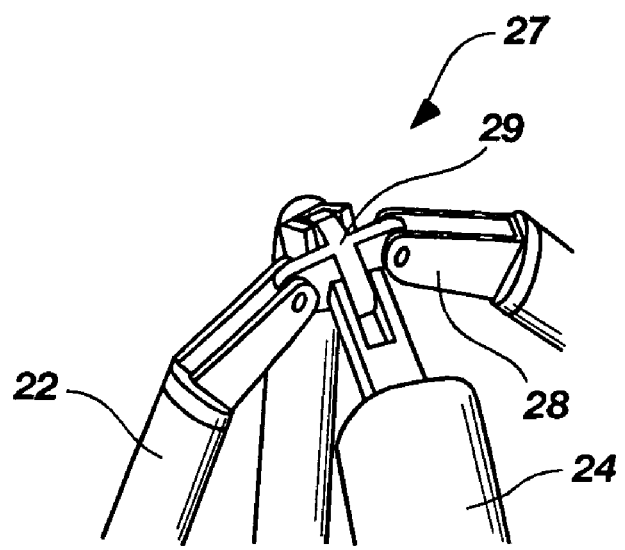
FIG. 7 is a perspective view of a corner joint hinge assembly used to connect a leg strut and an arm strut of one rectangular bay to a leg strut of a first adjoining rectangular bay and an arm strut of a second adjoining rectangular bay.

FIG. 7 illustrates a corner joint hinge mechanism 27 including a single hinge table 29 with four clevises 28 connected thereto by a pin joint. All of the clevises 28 are preferably synchronized with one another, as further described below. Alternatively, each corner joint hinge mechanism 27 may be a joint, pivot, or other suitable connecting mechanism that allows synchronous pivoting movement between two or more strut members.

The corner joint hinge mechanism 27 preferably connects an arm strut 22 and a leg strut 24 of a given rectangular bay structure to an arm strut of a first adjoining rectangular bay structure, and a leg strut of a second adjoining rectangular bay structure. In this fashion, rectangular bays may be tiled to one another, and may be synchronously deployed, as further described below.

Each of the four devises 28 of a hinge mechanism 27 is preferably arranged such that the arm struts 22 and leg struts 24 may be deployed into positions in which they are oriented at right angles to one another, thereby forming rectangular bay structures. Additionally, the devises 28 are preferably synchronized with one another such that all of the strut members attached thereto may be simultaneously deployed and maintain equal angles off the hinge table 29 during the deployment process, as described below. Each of the corner joint hinge mechanisms 27 may further include a latching mechanism, such as the latch 37 illustrated in FIG. 8, to provide stiffness to the structure, as further described below.

In a preferred synchronous deployment method, applying torque to any single joint can deploy a single or multiple bay system. The torque may be provided by stowed energy devices such as torsion springs, or extension springs positioned within the struts, or numerous other methods known in the art. Several proven methods are available to control the rate of deployment, such as applying viscous or magnetic damping, if it is desired to avoid dynamic events that may lead to excessive loads, such as from joints reaching their travel stops.

Figure 9:
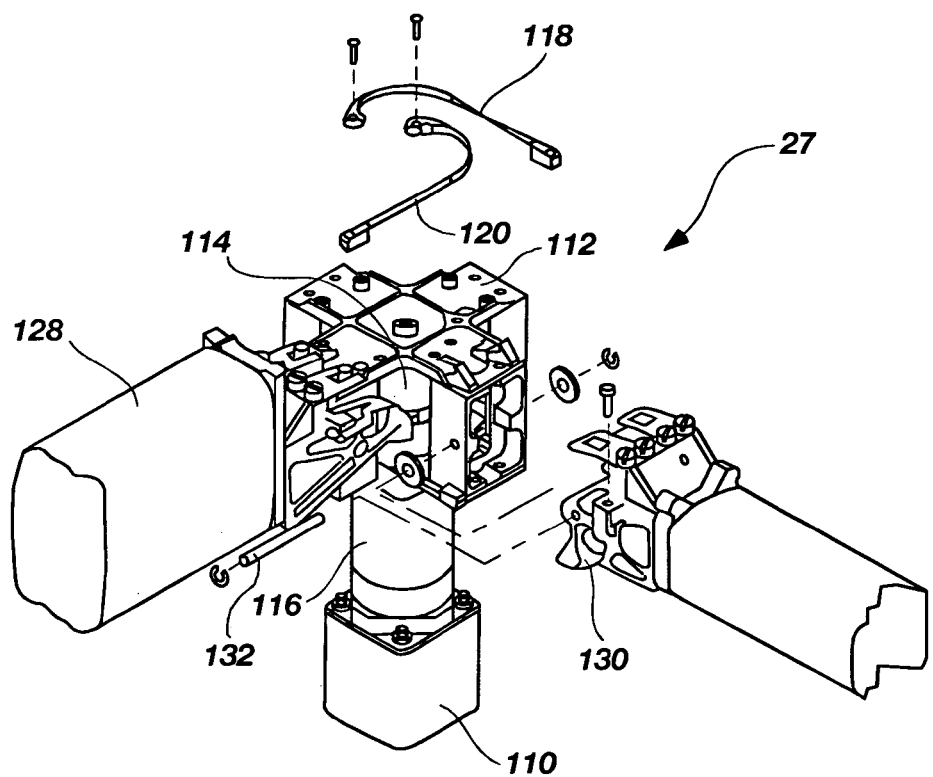
FIG. 9 is an exploded view of a corner joint latching hinge mechanism.
Figure 10:
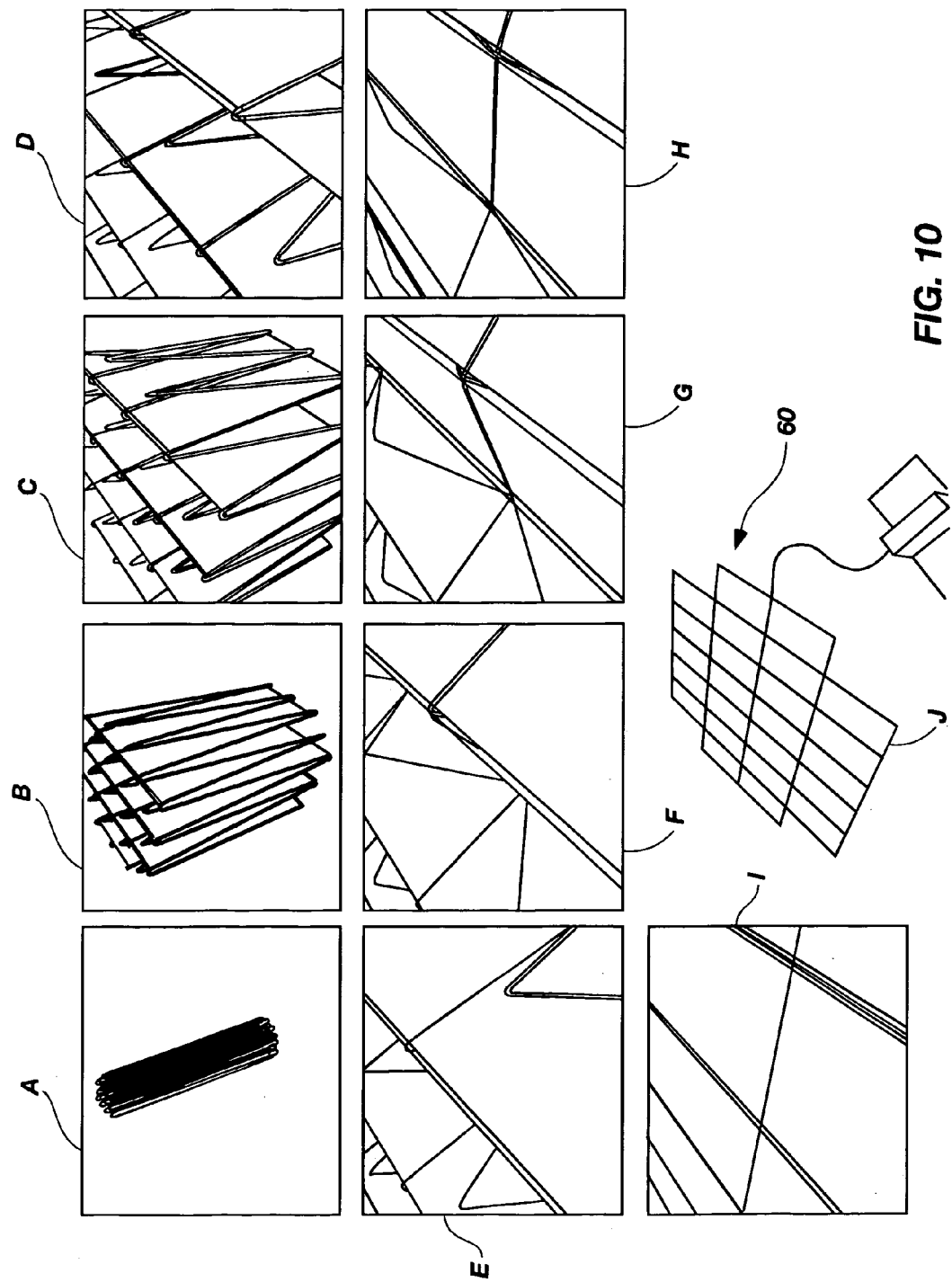
FIGS. 10A–10J are perspective step-by-step views of a modular rectangular array structure being synchronously deployed according to a preferred embodiment.

In a preferred aspect of the invention, the motive energy is input in a rate-controlled method by stepper motors 110 mounted at the hinge tables 112 of a corner joint hinge mechanism 27, as illustrated in FIG. 9. The motor 110, through a gearbox 116, drives a central drum 114. The drum 114 is preferably the shared synchronizing element for hinge table joint synchronization.

In a preferred aspect of the invention, the synchronizing association at the hinge tables 112 of corner joint hinge mechanism 27 is implemented at all hinge tables 112 in the structure. This provides numerous redundancies in the enforcement of synchronization of the overall structure and is also favorable in that it reduces cost through repeating identical mechanization.

In the corner joint hinge mechanism 27 shown in FIG. 9, synchronization is accomplished with a tape drive system. However, the synchronization of struts at the hinge table 112 can be accomplished by using a variety of other means, including using meshing beveled gears, sharing a drive rack, or by using any other suitable mechanism.

In such a system, the strut end devises 128 are preferably fabricated with two integral pulley sectors 130 each having their axis of rotation centered on a hinge pin 132. A first tape 118 is run from a fixed portion on the drum 114 toward one of the pulley sectors 130. The first tape 118 preferably twists 90 degrees, wraps a partial turn on the pulley sector 130, and ends at another fixed location.

A second tape 120 is preferably run from a fixed position on the other pulley sector 130 towards the drum 114. The second tape 120 preferably twists and wraps a partial turn on the drum 114 and ends at another fixed location.

As the drum 114 rotates to deploy the structure, the tension in the first tape 118 requires the joint to also rotate. The first tape 118 is pulled from the pulley sector 130 to the drum 114. At the same time, the second tape 120 is pulled from the drum 114 onto the pulley sector 130. Tension in the second tape 120 prevents the strut rotation from exceeding the drum angle position. The tape drive pair on each strut connected to the hinge table 112 is preferably preloaded to maintain accurate synchronization of each strut to the drum 114 and hence to each other. In this manner, the entire array structure may be synchronously deployed into a substantially planar configuration, as described above.

Figure 8:
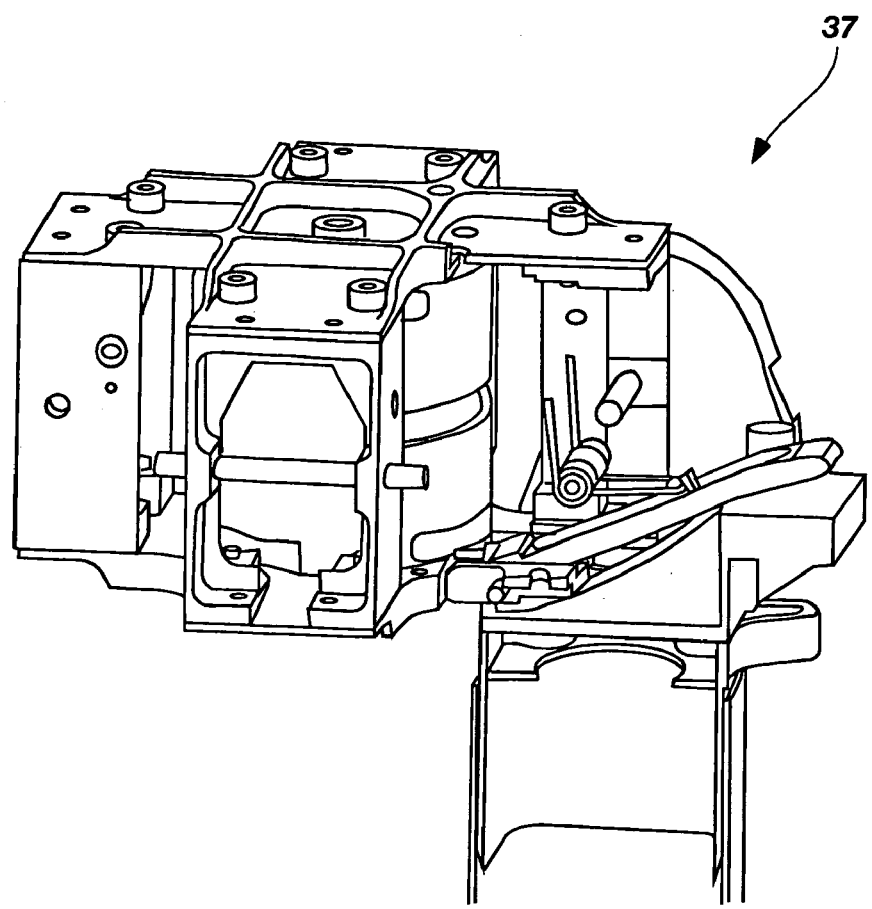
FIG. 8 is a cutaway view of a preferred corner joint latching hinge mechanism in an open position.

In a preferred embodiment, some or all of the corner joint hinge mechanisms 27 employed in the structure include a latch mechanism, such as the latch 37 illustrated in FIG. 8. Additionally, all of the leg strut-connecting hinge mechanisms 30 preferably include a latching mechanism. As a result, all of the hinges or joints may latch when the structure is fully deployed to provide greater stiffness and strength to the structure than is provided though the synchronization of the elements themselves. Latching all of the joints is preferred because it reduces cost through repeating identical mechanization.

FIGS. 10A–10J are perspective step-by-step views of a modular rectangular solar array structure 60 being synchronously deployed according to a preferred embodiment. In this embodiment, the blankets 34 are attached to opposed arm struts 22 in their respective strut bundles 32, such that the blankets 34 deploy concurrently with the strut bundles 32. The blankets 34 do not become twisted or tangled during deployment, due to the use of six strut members in each rectangular bay structure 20.

Figure 1C:
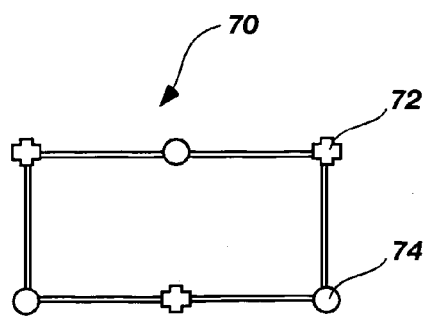
FIG. 1C is a diagrammatic view of a rectangular bay identifying hinge mechanisms with symbols indicating which direction each hinge mechanism moves during deployment and retraction of the bay, according to a preferred embodiment.

To illustrate, as the array structure 60 begins to deploy or retract, alternating hinge mechanisms on a given rectangular bay synchronously move in substantially the same direction, while the remaining hinge mechanisms move in substantially the opposite direction. For example, as illustrated in FIG. 1C, when the rectangular bay structure 70 is retracted into a compact strut bundle 32, the hinge mechanisms illustrated as crosses 72 move in a first direction (e.g., into the page), and the hinge mechanisms illustrated as circles 74 move in substantially the opposite direction (e.g., out of the page).

As a result, the six strut members are retracted into a compact strut bundle 32 (as shown in FIG. 1B), and the blanket 34 contained therein is folded up into a stowed position (as illustrated in FIG. 2) without twisting. Indeed, as long as an even number of leg struts 24 form opposing sides of bay structure 20, then the blanket 34 may be deployed concurrently with the strut bundle 32 without becoming twisted, as both arms 22 will remain parallel when the array structure 20 is deployed. Similarly, the respective hinge mechanisms may move in the opposite direction to synchronously retract the rectangular bay structure 70 into a strut bundle 32, without twisting the blanket 34. A plurality of tiled rectangular bay structures 70 may be synchronously retracted and deployed in the same or similar manner, such that an entire solar array, including blankets 34, may be synchronously retracted or deployed, as illustrated in FIGS. 10A–10J.

Figure 11:
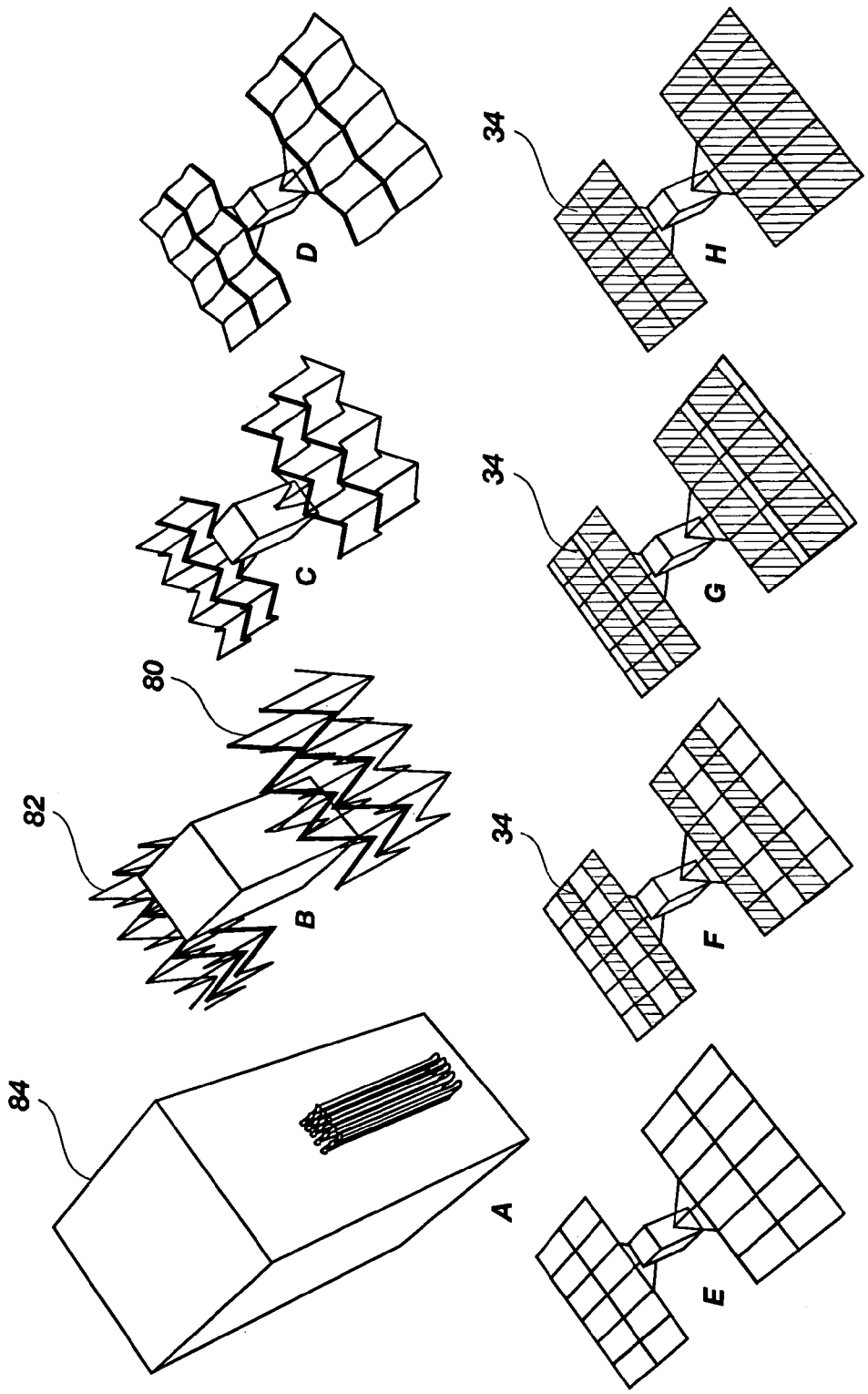
FIGS. 11A–11H are perspective step-by-step views of two modular rectangular array structures being synchronously deployed, followed by blankets, according to a preferred embodiment.

FIGS. 11A–11H are perspective step-by-step views of two modular rectangular solar array structures 80, 82 being synchronously deployed from a satellite 84. In this embodiment, each blanket 34 is attached to only one arm strut 22 in its respective strut bundle 32. After the array structures 80, 82 are fully deployed, as illustrated in FIG. 11E, the blankets 34 are deployed by motorized cables, or other suitable devices, as illustrated in FIGS. 11F–11H. This method may be used when deploying strut bundles 32 with an odd number of leg struts 24 on each side of the rectangular bay (e.g., four-strut and eight-strut bundles), since the blankets 34 are not deployed until after the array structures 80, 82 are fully deployed, and the blankets 34 are therefore not twisted during array deployment. This method, however, may also be used to deploy strut bundles 32 having an even number of leg struts 24 on each side of the rectangular bay (e.g., six-strut bundles).

Figure 12:
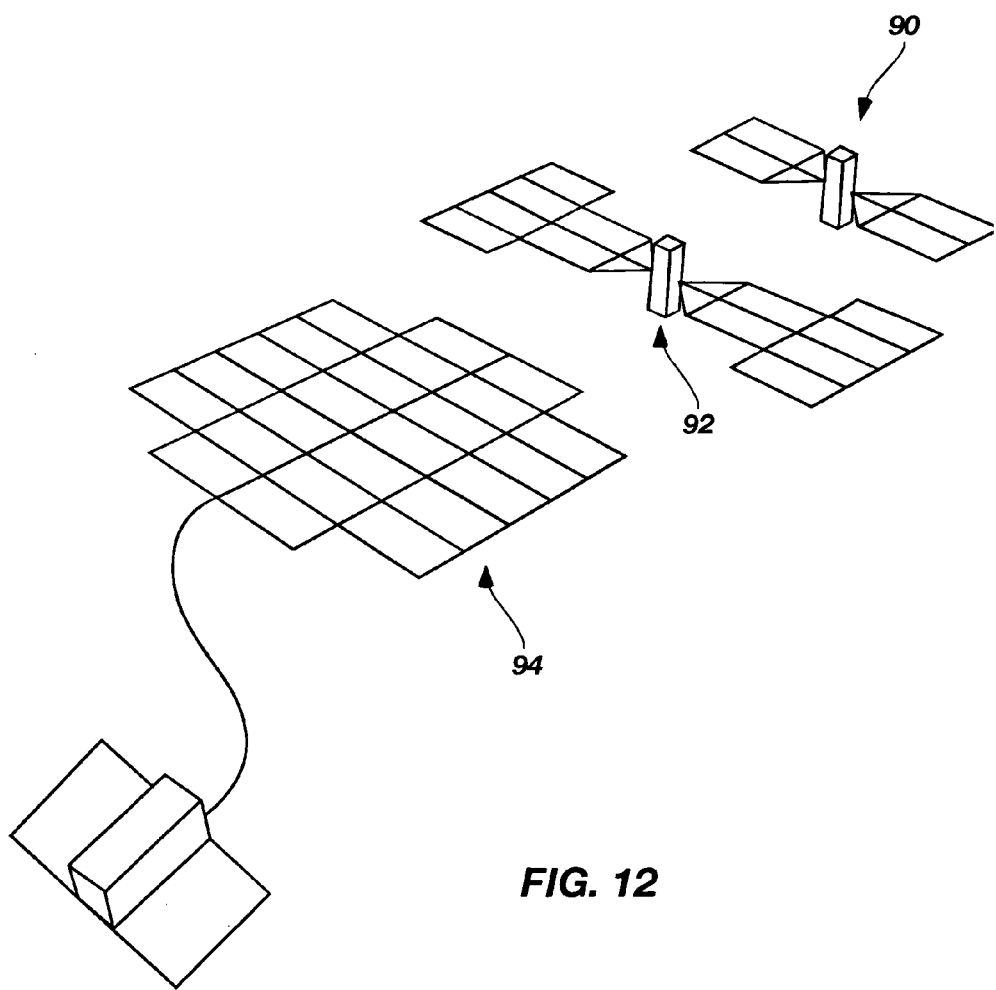
FIG. 12 includes perspective views of three modular rectangular array structures scaled to meet various power requirements.

FIG. 12 includes perspective views of three modular rectangular solar array structures 90, 92, 94, which are configured to produce varying amounts of power in proportion to their area. Larger areas may be constructed, to produce additional power, by tiling additional bays and/or increasing the length of the struts to create larger bays.

Because the rectangular bay structures preferably utilize lightweight strut members and hinge mechanisms in conjunction with thin film photovoltaics, the tiled array structure is preferably light in weight. Accordingly, there is practically no limit to how many rectangular bays may be tiled to one another on a given spacecraft. Thus, there is essentially no limit to the power that may be produced by a tiled rectangular array structure, due to its virtually unlimited scalability.

To emphasize, the ratio of power produced to mass of the structure is very high, and the ratio of cost of the structure to power produced is very low. Accordingly, vast array structures may be created via tiling to yield extremely efficient power supplying systems.

Figure 13C:
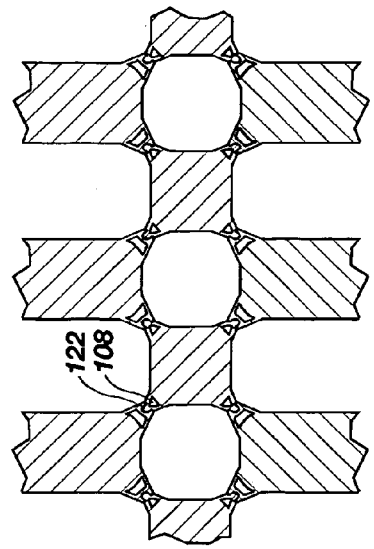
FIG. 13C is a close-up schematic view of a plurality of stowed strut bundles interlocked to one another.
Figure 13B:
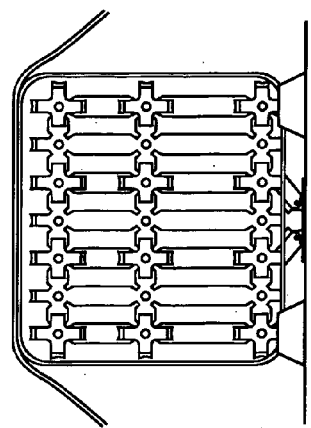
FIG. 13B is a top view of a plurality of stowed strut bundles interlocked to one another.
Figure 13A:
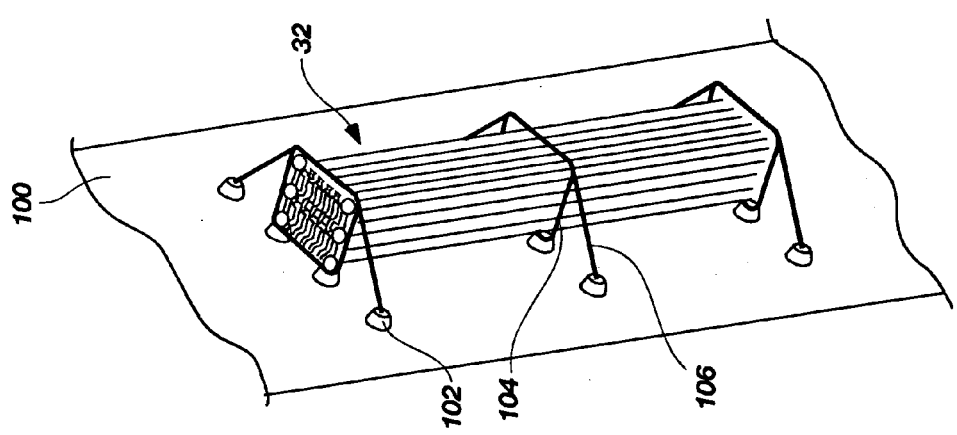
FIG. 13A is a perspective view of a strut bundle secured to a spacecraft.

FIG. 13A is a perspective view of a strut bundle 32 secured to a spacecraft 100 for launch, according to a preferred embodiment. The strut bundle 32 preferably rests on a plurality of pylons 102, or other suitable structures. A plurality of brackets 104, or similar structures, are preferably used to hold the strut bundle 32 in place. The brackets 104 are preferably secured to the spacecraft 100 via outrigger cables 106, or other suitable attachment devices. When the strut bundle 32 is to be deployed, the brackets 104 are unlocked or released from the spacecraft 100, such that the strut bundle 32 may freely deploy.

FIG. 13B is a top view of a plurality of stowed strut bundles 32 interlocked to one another. FIG. 13C is a close-up view of the plurality of stowed strut bundles 32 of FIG. 13B, illustrating complementary attachment mechanisms connecting the bundles to one another. The complementary attachment mechanisms may comprise complementary nipples 108 and indentations 122, or may include any other suitable connecting mechanisms.

Thus while embodiments and applications of the present invention have been shown and described, it would be apparent to one skilled in the art that other modifications are possible without departing from the inventive concepts herein. The invention, therefore, is not to be restricted except in the spirit of the claims that follow.

What is claimed is:

1. A deployable structure, comprising:
   a plurality of interconnected frame members synchronously deployable from a stowed position in which the frame members are compactly bundled to one another, to an operative position in which the frame members are fixed in a planar arrangement of orthogonal members forming a rectangular bay; and
   a blanket connected to at least one of the frame members and disposed between the plurality of frame members, wherein the blanket includes a plurality of photovoltaic elements disposed thereon.

2. The deployable structure of claim 1, wherein each of the plurality of frame members has a substantially rectangular cross section to facilitate compact nesting of the blanket between the plurality of frame members in the stowed position.

3. The deployable structure of claim 1, wherein the blanket is connected to at least two opposed frame members such that the blanket is simultaneously deployed within the rectangular bay when the frame members are deployed into the rectangular bay.

4. The deployable structure of claim 1, further comprising a plurality of hinge mechanisms connecting the plurality of frame members to one another.

5. The deployable structure of claim 1, wherein the rectangular bay comprises four frame members of substantially equal length connected to one another via four hinge mechanisms.

6. A deployable structure, comprising:
a plurality of interconnected frame members synchronously deployable from a stowed position in which the frame members are compactly bundled to one another, to an operative position in which the frame members are fixed in a planar arrangement of orthogonal members forming a rectangular bay;
a blanket connected to at least one of the frame members and disposed between the plurality of frame members; and
a motorized cable mechanism disposed on a frame member opposite the blanket, the cable mechanism including at least one cable attached to the blanket for pulling the blanket across the rectangular bay.

7. A deployable two-dimensional structure, comprising:
a plurality of interconnected frame members synchronously deployable from a stowed position in which the frame members are compactly bundled to one another, to an operative position in which the frame members are fixed in a two-dimensional planar arrangement of orthogonal members forming a planar rectangular bay; and
a blanket connected to at least one of the frame members and disposed between the plurality of frame members;
wherein the plurality of interconnected frame members form a plurality of rectangular bays that are tiled to one another, via hinge mechanisms, to form a modular planar array structure.

8. A deployable two-dimensional structure, comprising:
a plurality of interconnected frame members synchronously deployable from a stowed position in which the frame members are compactly bundled to one another, to an operative position in which the frame members are fixed in a two-dimensional planar arrangement of orthogonal members forming a planar rectangular bay; and
a blanket connected to at least one of the frame members and disposed between the plurality of frame members;
wherein the rectangular bay comprises six frame members of substantially equal length connected to one another via six hinge mechanisms.

9. The deployable structure of claim 8, wherein the six frame members comprise:
two leg struts linearly connected to one another at each of two opposed sides of the rectangular bay; and
an arm strut at each of two opposed ends of the rectangular bay, each arm strut connected to two of the opposed leg struts.

10. A deployable two-dimensional structure, comprising:
a plurality of rectangular planar frames tiled to one another to form a modular planar array structure, each planar frame comprising a set of frame members with adjacent planar frames sharing at least one common frame member, wherein the plurality of planar frames are synchronously retractable into a stowed position in which the frame members are compactly bundled to one another and each set of frame members defines a space between the respective frame members of the set for stowing a blanket.

11. The deployable structure of claim 10, further comprising a plurality of blankets, wherein each blanket is (i) connected to at least one frame member of a set of frame members forming a planar frame, (ii) has a deployed position in which the blanket is spread across the planar frame and (iii) has a stowed position in which the blanket is nested within the space between the respective frame members of the set of frame members forming the planar frame when the plurality of planar frames are retracted to the stowed position.

12. The deployable structure of claim 11, wherein the frame members have a substantially rectangular cross section to facilitate compact nesting of the blankets within the spaces.

13. The deployable structure of claim 10, further comprising a plurality of blankets, wherein each blanket (i) is connected to at least two opposed frame members of a set of frame members forming a planar frame, (ii) is simultaneously deployed within the planar frame when the set of frame members are deployed into a rectangular planar configuration and (iii) has a stowed position in which the blanket is nested within the space between the respective frame members of the set of frame members forming the planar frame when the plurality of planar frames are retracted to the stowed position.

14. The deployable structure of claim 10, further comprising a plurality of hinge mechanisms connecting the plurality of planar frames to one another, and connecting the frame members of each planar frame to one another.

15. The deployable structure of claim 10, wherein each planar frame comprises six frame members of substantially equal length connected to one another via six hinge mechanisms.

16. The deployable structure of claim 10, wherein the six frame members comprise:
two leg struts linearly connected to one another at each of two opposed sides of the rectangular planar frame; and
an arm strut at each of two opposed ends of the rectangular planar frame, each arm strut connected to two of the opposed leg struts.

17. The deployable structure of claim 10, wherein each planar frame comprises four frame members of substantially equal length connected to one another via four hinge mechanisms.

18. A deployable structure, comprising:
a plurality of rectangular planar frames tiled to one another to form a modular array structure, the plurality of planar frames retractable into a stowed position in which each frame comprises a plurality of frame members compactly bundled to one another;
a blanket connected to at least one frame member of each planar frame, and disposed between the plurality of frame members of the respective planar frame in the stowed position; and
a motorized cable mechanism disposed on a frame member opposite the blanket, the cable mechanism including at least one cable attached to the blanket for pulling the blanket across the respective planar frame after the frame members are deployed into a rectangular planar configuration.

19. A method of deploying a structure on a satellite or spacecraft, the method comprising:
prov018 a structure on a satellite or spacecraft in a first position, the structure comprising:
a blanket connected to at least one frame member of a plurality of interconnected frame members, the plurality of interconnected frame members and at least a portion of the blanket forming a bundle in the first position;
synchronously deploying the plurality of interconnected frame members from the first position to a second position, the plurality of interconnected frame members forming a structure comprising at least one frame in the second position; and
spreading a blanket across the at least one frame while simultaneously deploying the plurality of interconnected frame members.

20. A method of deploying a structure, the method comprising:
synchronously deploying a plurality of interconnected frame member bundles into a modular planar array structure comprised of a plurality of interconnected rectangular planar bays; and
simultaneously unfolding a blanket connected to at least two opposed frame members of at least one frame member bundle of the plurality of interconnected frame member bundles such that the blanket is spread across the planar bay formed by the deployed at least one frame member bundle.

21. A method of deploying a structure on a satellite or spacecraft, the method comprising:
providing a plurality of interconnected bundles in a stowed configuration on a satellite or spacecraft;
synchronously deploying the plurality of interconnected bundles into a plurality of modular planar bays; and
spreading at least one blanket across at least one modular planar bay of the plurality of modular planar bays via a motorized cable mechanism.

22. The method of claim 21, wherein providing a plurality of interconnected bundles comprises providing a plurality of interconnected bundles, each bundle of the plurality of bundles comprising a blanket connected to at least one frame member of a plurality of interconnected frame members, and wherein spreading at least one blanket comprises spreading the blanket of each bundle of the plurality of interconnected bundles across at least one modular planar bay of the plurality of modular planar bays.

23. A deployable two-dimensional structure, comprising:
a plurality of interconnected frame members synchronously deployable from a stowed position in which the frame members are compactly bundled to one another, to a deployed position in which the plurality of frame members form a modular planar array structure comprising a plurality of interconnected rectangular planar frames that are tiled next to one another, wherein each planar frame is formed from a set of an even number of frame members and adjacent planar frames share at least one common frame member, and wherein each set of frame members define a space between the respective frame members of the set when in the stowed position; and
a plurality of blankets, wherein each blanket is (i) connected to at least one frame member of a set of frame members, (ii) is adapted to be deployed across the rectangular planar frame formed by the deployed set of frame members, and (iii) is configured to be stowed within the space formed by the stowed set of frame members.

24. The deployable structure of claim 23, wherein at least one of the blankets includes a plurality of photovoltaic elements disposed thereon.

25. The deployable structure of claim 23, wherein each of the frame members have a substantially rectangular cross section to facilitate compact nesting of the blankets within the spaces.

26. The deployable structure of claim 23, wherein each blanket is connected to two opposed frame members of a set of frame members, the two opposed frame members maintaining parallel positioning as the set of frame members is synchronously deployed from the stowed position to the deployed position, and wherein each blanket is simultaneously deployed with the deployment of the respective sets of frame members.

27. The deployable structure of claim 23, wherein each set of frame members includes six frame members and when a set of frame members is deployed from the stowed position to the deployed position the six frame members comprise:
two leg struts linearly connected to one another at each of two opposed sides of a rectangular bay; and
an arm strut at each of two opposed ends of the rectangular bay, each arm strut connected to two of the opposed leg struts.

28. The deployable structure of claim 27, wherein the arm struts maintain parallel positioning as the set of frame members is synchronously deployed from the stowed position to the deployed position.

29. The deployable structure of claim 28, wherein a blanket is connected to the arm struts of each set of frame members and the blanket is simultaneously deployed with the deployment of the frame members.

* * * * *

UNITED STATES PATENT AND TRADEMARK OFFICE
CERTIFICATE OF CORRECTION

PATENT NO.         : 7,211,722 B1
APPLICATION NO.    : 10/117314
DATED              : May 1, 2007
INVENTOR(S)        : David Michael Murphy Page 1 of 1

It is certified that error appears in the above-identified patent and that said Letters Patent is hereby corrected as shown below:

On the title page:
In ITEM (56) References Cited
    OTHER PUBLICATIONS
    Page 1, 2nd column, 1st line of the
        1st entry (line 19),        change "Jones et al," to --Jones et al.,--

In the specification:
| | | |
|---|---|---|
| COLUMN 4, | LINE 39, | change "34" to --34 (FIG. 2)-- |
| COLUMN 5, | LINE 13, | change "bay" to --bay structure 20 (FIG. 1A)-- |
| COLUMN 5, | LINE 18, | change "compactly;" to --compactly-- |
| COLUMN 6, | LINE 12, | change "devises 28" to --clevises 28-- |
| COLUMN 6, | LINE 16, | change "devises 28" to --clevises 28-- |
| COLUMN 6, | LINE 54, | change "devises 128" to --clevises 128-- |
| COLUMN 7, | LINE 46, | change "of bay" to --of rectangular bay-- |
| COLUMN 7, | LINE 48, | change "arms 22" to --arm struts 22-- |
| COLUMN 7, | LINE 49, | change "structure 20" to --structure 40-- |

In the claims:
| | | |
|---|---|---|
| CLAIM 11, COLUMN 10, | LINE 9, | change "blanket is (i)" to --blanket (i) is-- |
| CLAIM 16, COLUMN 10, | LINE 41, | change "claim 10," to --claim 15,-- |
| CLAIM 23, COLUMN 12, | LINE 8, | change "define" to --defines-- |
| CLAIM 23, COLUMN 12, | LINE 11, | change "blanket is (i)" to --blanket (i) is-- |
| CLAIM 25, COLUMN 12, | LINE 22, | change "have" to --has-- |

Signed and Sealed this
Sixth Day of August, 2013

Teresa Stanek Rea
*Acting Director of the United States Patent and Trademark Office*